(12) United States Patent     (10) Patent No.:   US 12,600,039 B2

Shibata et al.         (45) Date of Patent:    Apr. 14, 2026

---

(54) ROBOT, CONVEYING SYSTEM, AND ROBOT-CONTROLLING METHOD

(71) Applicant: KAWASAKI JUKOGYO KABUSHIKI KAISHA, Kobe (JP)

(72) Inventors: Takeshi Shibata, Kobe (JP); Yuya Muroi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 75 days.

(21) Appl. No.: 18/622,015

(22) Filed: Mar. 29, 2024

(65) Prior Publication Data

US 2024/0326248 A1     Oct. 3, 2024

(30) Foreign Application Priority Data

Mar. 30, 2023    (JP) ................................. 2023-056568

(51) Int. Cl.
    *B25J 9/16*        (2006.01)
    *B25J 9/04*        (2006.01)
    *B25J 9/10*        (2006.01)

(52) U.S. Cl.
    CPC ............. *B25J 9/1666* (2013.01); *B25J 9/042* (2013.01); *B25J 9/102* (2013.01); *B25J 9/1612* (2013.01)

(58) Field of Classification Search
    CPC . B25J 9/1666; B25J 9/042; B25J 9/102; B25J 9/1612
    USPC .................. 700/245–264; 318/568.11–568.25
    See application file for complete search history.

(56) References Cited

U.S. PATENT DOCUMENTS

| | | | |
|---|---|---|---|
| 7,874,782 B2 | 1/2011 | Hashimoto | |
| RE45,772 E | 10/2015 | Hashimoto | |
| RE46,465 E | 7/2017 | Hashimoto | |
| RE47,145 E | 11/2018 | Hashimoto | |
| RE47,909 E | 3/2020 | Hashimoto | |
| RE48,031 E | 6/2020 | Hashimoto | |
| RE48,792 E | 10/2021 | Hashimoto | |
| RE49,671 E | 9/2023 | Hashimoto | |
| 2001/0041129 A1* | 11/2001 | Tsuneda | H01L 21/67796 414/744.1 |
| 2013/0190923 A1* | 7/2013 | Kimura | B25J 19/02 901/46 |
| 2014/0140801 A1* | 5/2014 | Sueyoshi | B25J 11/0095 414/800 |
| 2014/0277711 A1* | 9/2014 | Tomo | B25J 15/0616 700/245 |
| 2016/0055425 A1* | 2/2016 | Minami | G05B 19/425 706/12 |
| 2016/0318182 A1* | 11/2016 | Nakaya | B25J 9/1697 |
| 2019/0001500 A1* | 1/2019 | Kitahara | B25J 9/044 |
| 2020/0002104 A1* | 1/2020 | Bussiere | B65G 47/90 |

(Continued)

FOREIGN PATENT DOCUMENTS

| | | |
|---|---|---|
| JP | 4098338 B2 | 6/2008 |
| JP | 2009-194046 A | 8/2009 |

(Continued)

*Primary Examiner* — Wade Miles
*Assistant Examiner* — Sidney Leigh Molnar
(74) *Attorney, Agent, or Firm* — OLIFF PLC

(57)          ABSTRACT

A robot according to this disclosure includes a controller configured to control operations of a hand(s) and a robot arm to convey a workpiece(s) with distances between a center(s) of the hand(s) and end surfaces of the workpiece(s) being uneven so as to prevent interference of the workpiece with a wall.

12 Claims, 6 Drawing Sheets

(56) References Cited

U.S. PATENT DOCUMENTS

2020/0047331 A1 * 2/2020 Chitta .................. B25J 15/0683
2021/0107050 A1 * 4/2021 Secibovic ............ B21D 43/105
2024/0051118 A1 * 2/2024 Geng ....................... B25J 9/042

FOREIGN PATENT DOCUMENTS

JP            4980127 B2      7/2012
JP        2014-103156 A      6/2014
WO    WO-2009099107 A1 *  8/2009   ....... H01L 21/67742
WO    WO-2011077693 A1 *  6/2011   ............ B25J 9/1612

* cited by examiner

ROBOT, CONVEYING SYSTEM, AND ROBOT-CONTROLLING METHOD

CROSS-REFERENCE TO RELATED APPLICATION

The priority application number JP2023-056568, Robot, Mar. 30, 2023, Takeshi SHIBATA, and Yuya MUROI, upon which this patent application is based, are hereby incorporated by reference.

BACKGROUND OF THE INVENTION

Field of the Invention

The present disclosure relates to a robot, a conveying system, and a robot-controlling method.

Description of the Background Art

Robots including a robot arm are known in the art. Japanese Patent Laid-Open Publication No. JP2014-103156 discloses a substrate-conveying robot for conveying a glass substrate. The substrate-conveying robot includes an extensible/retractable arm unit having a distal end to which a hand is provided, and a running table for moving the extensible/retractable arm unit along a running axis. The substrate conveying robot transfers the glass substrate from a cassette to a predetermined transfer place by executing various operations such as extension/retraction of extensible/retractable arm unit, and a running axis operation of the running table.

In some substrate conveying robots similar to the substrate conveying robot disclosed in the above Japanese Patent Laid-Open Publication No. JP2014-103156, a robot arm and a hand are placed in space surrounded by walls. In a case of such substrate transfer robots, if a glass substrate comes into interference with the wall when the glass substrate is conveyed by the robot arm and the hand, the glass substrate cannot be smoothly conveyed.

SUMMARY OF THE INVENTION

The disclosure invention is intended to solve the above problem, and one object of the present disclosure is to provide a robot, a conveying system, and a robot-controlling method capable of preventing interference of a workpiece with w wall and of smoothly conveying the workpiece.

A robot according to a first aspect of the present disclosure includes a base; a horizontal multi-joint robot arm connected to the base; a hand(s) arranged in a distal end part of the robot arm and configured to hold a rectangular plate-shaped workpiece(s); and a controller configured to control operations of the hand(s) and the robot arm so as to convey the workpiece(s) between a plurality of receiving parts, wherein the hand(s) and the robot arm are arranged in conveying space surrounded by walls, and the controller is configured to control the operations of the hand(s) and the robot arm to convey the workpiece(s) with distances between a center(s) of the hand(s) and end surfaces of the workpiece(s) being uneven so as to prevent interference of the workpiece(s) with the wall.

A conveying system according to a second aspect of the present disclosure includes a substrate conveyor including conveying space; and a robot arranged in the substrate conveyor, wherein the robot includes a base; a horizontal multi-joint robot arm connected to the base; a hand(s)

arranged in a distal end part of the robot arm and configured to hold a rectangular plate-shaped workpiece(s); and a controller configured to control operations of the hand(s) and the robot arm so as to convey the workpiece(s) between a plurality of receiving parts, wherein the hand(s) and the robot arm are arranged in conveying space surrounded by walls, and the controller is configured to control the operations of the hand(s) and the robot arm to convey the workpiece(s) with distances between a center(s) of the hand(s) and end surfaces of the workpiece(s) being uneven so as to prevent interference of the workpiece(s) with the wall.

A method according to a third aspect of the present disclosure is a method for controlling a robot including a base, a horizontal multi-joint robot arm connected to the base; a hand(s) arranged in a distal end part of the robot arm and configured to hold a rectangular plate-shaped workpiece(s), the hand(s) and the robot arm being arranged in conveying space surrounded by walls, the method including controlling operations of the hand(s) and the robot arm so as to convey the workpiece(s) between a plurality of receiving parts, wherein the controlling operations of the hand(s) and the robot arm includes controlling the operations of the hand(s) and the robot arm to convey the workpiece(s) with distances between a center(s) of the hand(s) and end surfaces of the workpiece(s) being uneven so as to prevent interference of the workpiece(s) with the wall.

In the robot according to the first aspect, the conveying system according to the second aspect and the robot-controlling method according to the third aspect of the present disclosure, as discussed above, the operations of the hand and the robot arm are controlled to convey the workpiece with distances between a center of the hand and end surfaces of the workpiece being uneven so as to prevent interference of the workpiece with the wall. Accordingly, even in a case in which the workpiece will interfere with the wall with the workpiece being arranged at the center of the hand, interference of the workpiece with the wall can be prevented by conveying the workpiece with the distances between the center of the hand and end surfaces of the workpiece being uneven. Consequently, it is possible to smoothly convey the workpiece.

According to the present disclosure, it is possible to prevent interference of the workpiece with the wall so as to smoothly convey the workpiece.

DESCRIPTION OF THE PREFERRED EMBODIMENT

The following description will describe an embodiment embodying the present disclosure with reference to the drawings. In this specification, an upward/downward direction is defined as a Z direction. An upper side is defined a Z1 side, and a lower side is defined as a Z2 side. A direction orthogonal to the Z direction is defined as an X direction. One side in the X direction is defined as an X1 side, and another side is defined as an X2 side. A direction orthogonal to the Z direction and the X direction is defined as a Y direction. One side in the Y direction is defined as an Y1 side, and another side is defined as an Y2 side.

Configuration of Substrate Processing System

Figure 1:
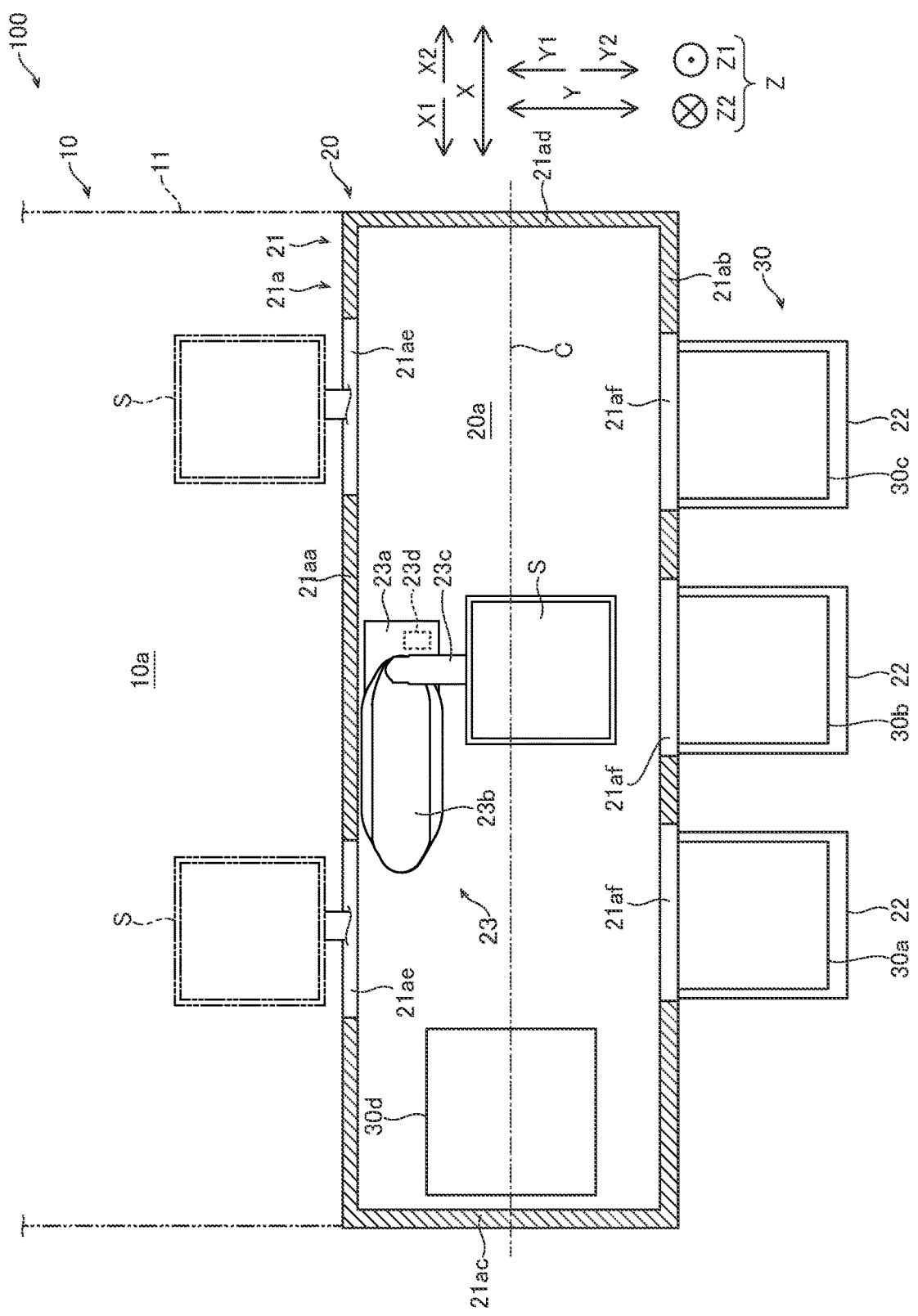
FIG. 1 is a schematic diagram showing a configuration of a substrate processing system according to one embodiment.

As shown in FIG. 1, a substrate processing system 100 is a system for conveying a substrate S having a rectangular plate-like shape, and applying predetermined processing to the substrate conveyed. The substrate processing system 100 includes a substrate processor 10, and a substrate conveyor 20. The substrate S is an example of a workpiece.

The substrate processor 10 is an apparatus for applying the predetermined processing to the substrate S in processing space 10*a* in which an atmosphere is previously adjusted. The atmosphere in the processing space 10*a* is previously adjusted to a predetermined degree of cleanliness, for example. For example, the predetermined degree of cleanliness can be CLASS1 specified by International Organization for Standardization (ISO).

The substrate processor 10 includes a housing 11 defining with the processing space 10*a*, and a plurality of receiving parts. The plurality of receiving parts are arranged in the processing space 10*a* of the housing 11. The substrate S is conveyed to and placed on each of the plurality of receiving parts by a robot 23, which will be described later, in the substrate conveyor 20. After placed on each of the receiving parts, the substrate S is subjected to the predetermined processing in the processing space 10*a*.

The substrate conveyor 20 conveys the substrate S through conveying space 20*a* in which the atmosphere is previously adjusted. An atmosphere in the conveying space 20*a* is previously adjusted to a predetermined degree of cleanliness, for example. For example, the predetermined degree of cleanliness can be CLASS1 specified by International Organization for Standardization. The substrate conveyor 20 is also known as Equipment Front End Module (EFEM). The substrate processor 10 is arranged on a Y1 side of a housing 21, which will be described later, of the substrate conveyor 20, and a plurality of receiving parts 30*a*, 30*b* and 30*c* are arranged on a Y2 side of the housing 21. The plurality of receiving parts 30*a*, 30*b* and 30*c* are substrate containers. Each substrate container accommodates a plurality of substrates S.

The substrate conveyor 20 includes the housing 21 defining the conveying space 20*a*, a plurality of supports 22, the robot 23, and a receiving part 30*d*. The substrate conveyor 20 does not include a mover that is configured to drive a base 23*a* to run.

The housing 21 includes walls 21*a* defining the conveying space 20*a*. The walls 21*a* are walls that extend in the Z direction and surrounds all the sides of the robot 23 and all the sides of the receiving part 30*d*. That is, the walls 21*a* include a Y1-side wall 21*aa*, a Y2-side wall 21*ab* on the, an X1-side wall 21*ac*, and an X2-side wall 21*ad*. The walls 21*a* form a rectangular shape as viewed in a plan view.

The wall 21*aa*, which faces the substrate processor 10, has a plurality of openings 21*ae* formed to convey the substrate S between the processing space 10*a* and the conveying space 20*a*. Each of the plurality of openings 21*ae* communicates the processing space 10*a* with the conveying space 20*a*, and has a size that allows the substrate S to pass through the opening. Each of the plurality of openings 21*ae* is provided to corresponding one of the plurality of receiving parts of the substrate processor 10.

The wall 21*ab*, which faces the plurality of receiving parts 30*a*, 30*b* and 30*c*, has a plurality of openings 21*af* each of which is formed to convey the substrate S between space in the substrate container and the conveying space 20*a*. Each of the plurality of openings 21*af* is connected to the space of the substrate container and the conveying space 20*a*, and has a size that allows the substrate S to pass through the opening. Each of the plurality of openings 21*af* are provided to corresponding one of the plurality of receiving parts 30*a*, 30*b* and 30*c*.

Supports 22 are mounts for supporting a lower part of the substrate container. That is, each of the plurality of supports 22 supports the lower part of corresponding one of the plurality of receiving parts 30*a*, 30*b* and 30*c*. Each of the plurality of supports 22 are arranged corresponding to corresponding one of the three openings 21*af*. The plurality of supports 22, and the plurality of receiving parts 30*a*, 30*b* and 30*c* are arranged on an exterior side the housing 21.

The robot 23, and the receiving parts 30*d* are arranged in the conveying space 20*a* of the housing 21. Specifically, the robot 23, and the receiving parts 30*d* are surrounded by the walls 21*a* forming the housing 21. The substrate S is conveyed to and placed on the receiving part 30*d* by the robot 23. The receiving part 30*d* is an aligner configured to align the substrate S placed to adjust an orientation of the substrate S. The receiving parts 30*a*, 30*b*, 30*c* and 30*d*, and the plurality of receiving parts of the substrate processor 10 are occasionally collectively referred to as the receiving part 30.

The robot 23 is a substrate-conveying robot for conveying the substrate S between the plurality of receiving parts 30 through the conveying space 20*a*. For example, the robot 23 obtains the substrate S from one of the plurality of receiving parts 30*a*, 30*b* and 30*c* as the substrate container, and conveys the obtained substrate S to the receiving part 30*d* as the aligner. For example, the robot 23 obtains the aligned substrate S from the receiving part 30*d*, and then conveys the obtained substrate S to one of the plurality of receiving parts of the substrate processor 10.

Figure 2:
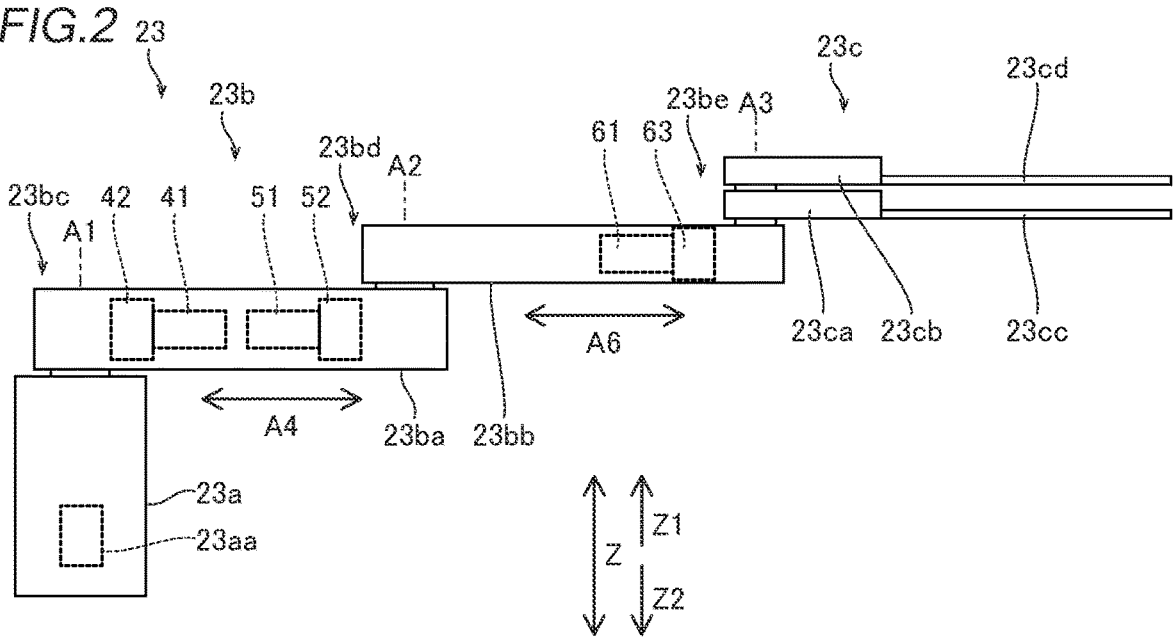
FIG. 2 is a schematic side view showing a robot according to the one embodiment.
Figure 3:
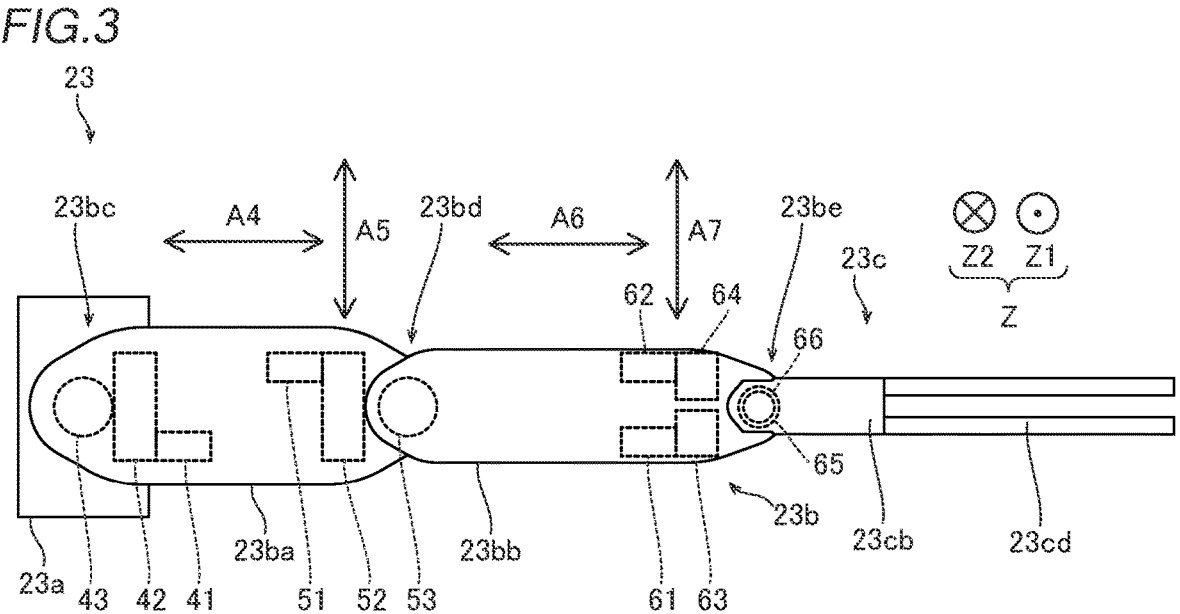
FIG. 3 is a schematic plan view showing the robot according to the one embodiment.

As shown in FIGS. 1 to 3, the robot 23 includes the base 23*a*, a robot arm 23*b*, hands 23*c*, and a controller 23*d*.

The base 23*a* is a mount for supporting the robot arm 23*b*. The base 23*a* is installed on an installation surface such as a floor. Also, the base 23*a* is positioned at a position that is deviated from a center line C of the conveying space 20*a*. The base 23*a* is arranged on a Y1-side wall 21*aa* side part, which is located close to the wall 21*aa*. Also, an upward/downward mover 23*aa* for moving the robot arm 23*b* upward/downward is included in the base 23*a*. The upward/downward mover 23*aa* includes an electric motor as a driving source, and configured to move the robot arm 23*b* upward/downward relative to the base 23*a* in the Z direction.

The robot arm 23*b* is a horizontal multi-joint robot arm. The robot arm 23*b* has a proximal end rotatably connected to the base 23*a*. A configuration of the robot arm 23*b* is described in detail later.

The hand 23*c* is configured to hold the substrate S having a rectangular shape. The hand 23*c* is arranged in a distal end part of the robot arm 23*b*. Also, the hands 23*c* include a first hand 23*ca*, and a second hand 23*cb* arranged above the first hand 23*ca* and configured to operate independently of the first hand 23*ca*. The first hand 23*ca* includes a support 23*cc* for supporting a lower part of the substrate S. Also, the second hand 23*cb* includes a support 23*cd* for supporting the lower part of the substrate S. Each of the supports 23*cc* and 23*cd* is a thin plate for supporting the lower part of the substrate S. Each of the supports 23*cc* and 23*cd* can support one substrate S.

The controller 23*d* includes a processor such as a CPU configured to execute a program and a storage such as a memory configured to store the program, and controls operation of the robot 23. Specifically, the controller 23*d* is configured to control operations of the hands 23*c* and the robot arm 23*b* so as to convey the substrate S between the plurality of receiving parts 30 through the conveying space 20*a* without moving the base 23*a* in a horizontal direction. More specifically, the controller 23*d* is configured to control the operations of the hands 23*c* and the robot arm 23*b* by controlling a plurality of joints 23*bc*, 23*bd* and 23*be* of the robot arm 23*b*, which will be discussed later.

Figure 5:
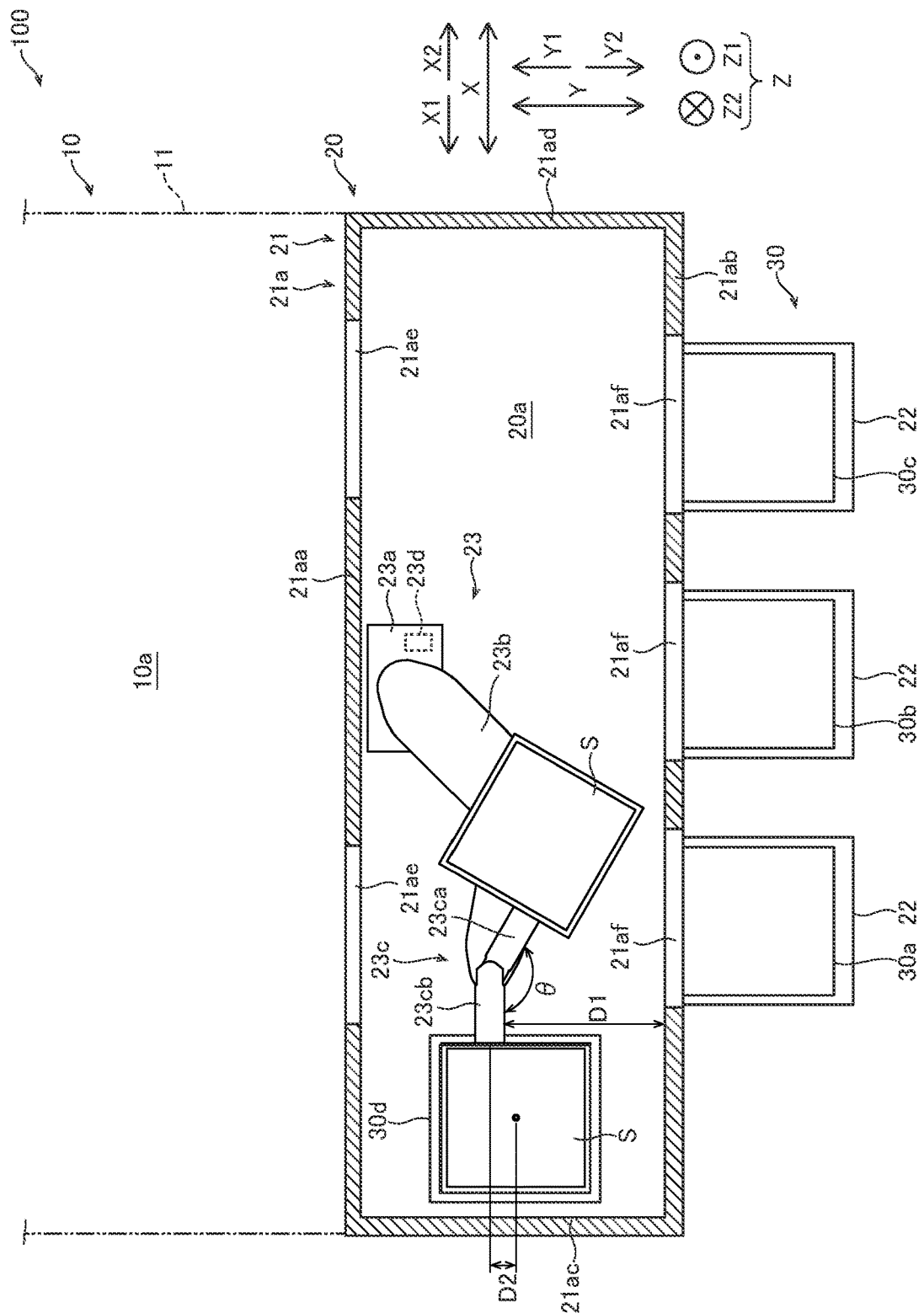
FIG. 5 is a schematic view illustrating conveyance of a substrate in the robot according to the one embodiment.

Also, as shown in FIG. 5, the controller 23*d* is configured to control the operations of the hands 23*c* so as to move, when one of the first hand 23*ca* and the second hand 23*cb* enters the receiving part 30 as an entry hand, another of the first hand 23*ca* and the second hand 23*cb* as a leaving hand away from the receiving part 30. In this case, the controller 23*d* rotates the leaving hand by a predetermined angle θ with respect to the entry hand so as to make the leaving hand leave from the receiving part 30 where the entry hand enters. Although the second hand 23*cb* and the first hand 23*ca* are illustratively shown as the entry hand and the leaving hand, respectively, in FIG. 5, the operations of the hands are similar to a case in which the first hand 23*ca* and the second hand 23*cb* are the entry hand and the leaving hand, respectively. Although the entry hand is illustratively shown to enter the receiving part 30*d*, the operation of the hand is similar to a case in which the entry hand enters the receiving part 30 other than the receiving part 30*d*.

Detailed Configuration of Robot Arm

As shown in FIGS. 2 and 3, the robot arm 23*b* includes a plurality of links 23*ba* and 23*bb*, and the plurality of joints 23*bc*, 23*bd* and 23*be*.

The plurality of links 23*ba* and 23*bb* include a first link 23*ba* and a second link 23*bb*. A proximal end of the first link 23*ba* is connected to the base 23*a* rotatably about a rotation axis A1 extending in the Z direction. The first link 23*ba* does not rotate in a range of 360 degrees but rotates in a range of 180 degrees about the rotation axis A1. Also, a proximal end of the second link 23*bb* is connected to a distal end of the first link 23*ba* rotatably about a rotation axis A2 extending in the Z direction. Also, the hands 23*c* are connected to a distal end of the second link 23*bb* rotatably about a rotation axis A3 extending in the Z direction.

The plurality of joints 23*bc*, 23*bd* and 23*be* include a first joint 23*bc*, a second joint 23*bd*, and a third joint 23*be*. The first joint 23*bc* is a shoulder joint configured to drive the first link 23*ba*, and is arranged in a connection between the proximal end of the first link 23*ba* and the base 23*a*. The second joint 23*bd* is an elbow joint configured to drive the second link 23*bb*, and is arranged in a connection between the distal end of the first link 23*ba* and the proximal end of the second link 23*bb*. The third joint 23*be* is a wrist joint configured to drive the hand 23*c*, and is arranged in a connection between the distal end of the second link 23*bb* and the proximal end of the hand 23*c*.

In the first embodiment, each of the plurality of joints 23*bc*, 23*bd* and 23*be* includes an electric motor, and a speed reducer including gears. Specifically, the first joint 23*bc* includes an electric motor 41, and a speed reducer 42 including gears. The second joint 23*bd* includes an electric motor 51, and a speed reducer 52 including gears. The third joint 23*be* includes a plurality of electric motors 61 and 62, and speed reducers 63 and 64 each of which includes gears. Each of speed reducers 42, 52, 63 and 64 includes a gear a gear set including a plurality of gears for providing a predetermined reduction ratio.

The speed reducer 42 of the first joint 23*bc* is connected through a final gear of the gear set to a rotating shaft 43 configured to rotate the first link 23*ba* about the rotational axis line A1. The first joint 23*bc* transmits a driving force of the electric motor 41 to the rotating shaft 43 through the speed reducer 42. As a result, the first joint 23*bc* rotates the rotating shaft 43 about the rotation axis A1, and the first link 23*ba* about the rotation axis A1.

The speed reducer 52 of the second joint 23*bd* is connected through a final gear of the gear set to a rotating shaft 53 configured to rotate the second link 23*bb* about the rotational axis line A2. The second joint 23*bd* transmits a driving force of the electric motor 51 to the rotating shaft 53 through the speed reducer 52. As a result, the second joint 23*bd* rotates the rotating shaft 53 about the rotation axis A2, and the second link 23*bb* about the rotation axis A2.

The speed reducer 63 of the third joint 23*be* is connected through a final gear of the gear set to a rotating shaft 65 configured to rotate the first hand 23*ca* about the rotational axis line A3. The third joint 23*be* transmits a driving force of the electric motor 61 to the rotating shaft 65 through the speed reducer 63. As a result, the third joint 23*be* rotates the rotating shaft 65 about the rotation axis A3, and the first hand 23*ca* about the rotation axis A3.

Also, the speed reducer 64 of the third joint 23*be* is connected through a final gear of the gear set to a rotating shaft 66 arranged coaxial with the rotating shaft 65 and configured to rotate the second hand 23*cb* about the rotational axis line A3. The third joint 23*be* transmits a driving force of the electric motor 62 to the rotating shaft 66 through the speed reducer 64. As a result, the third joint 23*be* rotates the rotating shaft 66 about the rotation axis A3, and the second hand 23*cb* about the rotation axis A3.

Accordingly, the first link 23*ba*, the second link 23*bb*, the first hand 23*ca* and the second hand 23*cb* can be operated independently of each other by plurality of joints 23*bc*, 23*bd* and 23*be*.

Also, in the first embodiment, electric motors 41 and 51 and the speed reducers 42 and 52 of the first joint 23*bc* and the second joint 23*bd* are arranged in the first link 23*ba*. Specifically, the electric motor 41 of the first joint 23*bc* is arranged to face the proximal end in the first link 23*ba* in an orientation parallel to an extension direction A4 of the first link 23*ba*. In other words, an output shaft of the electric motor 41 of the first joint 23*bc* extends in the extension direction A4 of the first link 23*ba*, and faces the proximal end of the first link. Also, the electric motor 51 of the second joint 23*bd* is arranged to face the distal end in the first link 23*ba* in an orientation parallel to the extension direction A4 of the first link 23*ba*. In other words, an output shaft of the electric motor 51 of the second joint 23*bd* extends in the extension direction A4 of the first link 23*ba*, and faces the distal end of the first link. The electric motor 41 of the first joint 23*bc* and the electric motor 51 of the second joint 23*bd* are arranged in the first link 23*ba* in opposite directions to each other.

Also, the electric motor 41 and the speed reducer 42 of the first joint 23*bc* are arranged in a proximal end part of the first link 23*ba*. Also, the electric motor 51 and the speed reducer 52 of the second joint 23*bd* are arranged in a distal end part of the first link 23*ba*. Also, the electric motor 41 of the first joint 23*bc* and the electric motor 51 of the second joint 23*bd* are arranged in one part and another part, respectively, in a direction A5 direction orthogonal to both the extension direction A4 of the first link 23*ba* and the Z direction. Because a distance between the electric motor 41 of the first joint 23*bc* and the electric motor 51 of the second joint 23*bd* in the first link 23*ba* is maximized, it is possible to easily provide space for the electric motors in the first link 23*ba*.

Also, in the first embodiment, the electric motors 61 and 62 and the speed reducers 63 and 64 of the third joint 23*be* are arranged in the second link 23*bb*. Specifically, the electric motors 61 and 62 of the third joint 23*be* are arranged to face the distal end in the second link 23*bb* in an orientation parallel to an extension direction A6 of the second link 23*bb*. In other words, output shafts of the electric motors 61 and 62 of the third joint 23*be* extend in the extension direction A6 of the second link 23*bb*. Also, the electric motors 61 and 62 and speed reducers 63 and 64 of the third joint 23*be* are arranged in a distal end part of the second link 23*bb*. Also, the electric motors 61 and 62 of the third joint 23*be* are arranged in one part and another part, respectively, in a direction A7 direction orthogonal to both the extension direction A6 of the second link 23*bb* and the Z direction.

Substrate-Conveying Control

Figure 4:
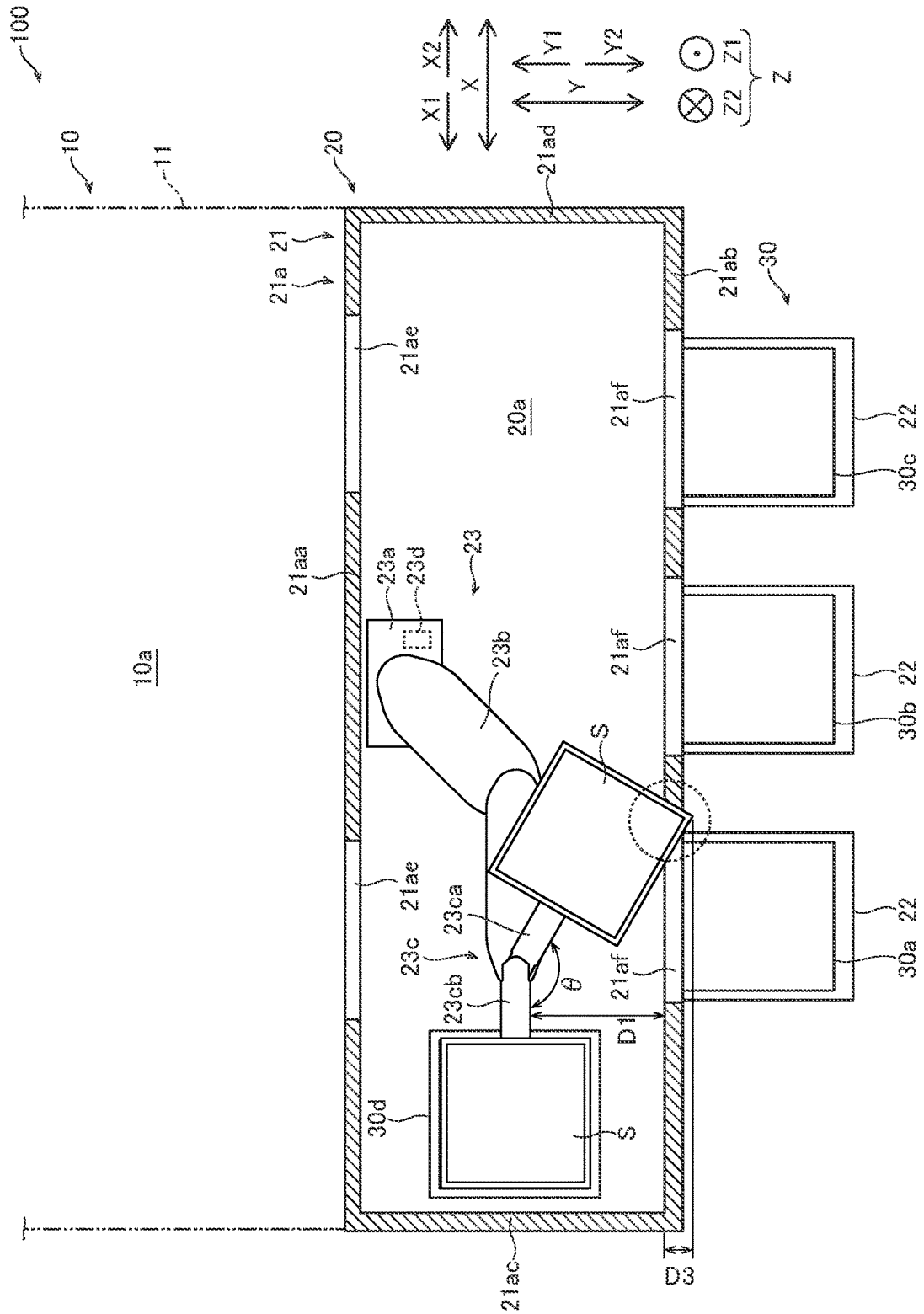
FIG. 4 is a schematic view illustrating exemplary conveyance of a substrate with the substrate being arranged in a center of a hand.

As shown in FIG. 4, if the substrate S is conveyed with the substrate S being position at a center of the hand 23*c*, the substrate S interferes with the wall 21*a* in some cases. Specifically, if the substrate S is conveyed with the substrate S being position at the center of the entry hand, a distance D1 between the wall 21*a* and the entry hand becomes insufficient so that the substrate S held by the leaving hand interferes with the wall 21*a* when the leaving hand leaves.

To address this, as shown in FIG. 5, in the first embodiment, the controller 23*d* controls the operations of the hands 23*c* and the robot arm 23*b* to convey the substrate S with distances between the centers of the hands 23*c* and end surfaces of the substrate S being uneven so as to prevent interference of the substrate S with the wall 21*a*. Specifically, the controller 23*d* controls the operations of the hands 23*c* and the robot arm 23*b* to convey the substrate S with the distances between the centers of the hands 23*c* and the end surface of the substrate S being varied by deviating the substrate S by a predetermined distance D2 with respect to the center of the entry hand in a direction in which the leaving hand moves away from the receiving part 30 so as to prevent interference of the substrate S, which is held by the leaving hand, with the wall 21*a*. Accordingly, because the distance D1 between the wall 21*a* and the entry hand can be sufficient, it is possible to prevent that the substrate S held by the leaving hand interferes with the wall 21*a* when the leaving hand leaves. The direction in which the leaving hand moves away from the receiving part 30 is a direction of rotation of the leaving hand, and corresponds to a direction toward the Y2 side in FIG. 5.

For example, the controller 23*d* controls each of the first hand 23*ca* and the second hand 23*cb* so as to obtain the substrate S from one of the plurality of receiving parts 30*a*, 30*b* and 30*c* as the substrate container with the substrate S being deviated by the predetermined distance D1. Subsequently, the controller 23*d* controls each of the first hand 23*ca* and the second hand 23*cb* so as to convey the substrate S to the receiving part 30*d* as the aligner or the receiving part of the substrate processor 10 with the substrate S being deviated by the predetermined distance D1.

The predetermined distance D2 is specified based on a degree of interference between the wall 21*a* and the substrate S. Specifically, the predetermined distance D2 is specified greater than a distance D3 (see FIG. 4) between an interior part of the wall 21*a* and a part of the substrate S that interferes with the wall in a case in which the substrate is positioned at the center of the hand 23*c*. More specifically, the predetermined distance D2 is specified to a value obtained by adding a margin to the distance D3. Accordingly, it is possible to surely prevent that the substrate S interferes with the wall 21*a*.

In a case in which with the substrate S is conveyed with being deviated with respect to the center of the hand 23*c*, it is necessary to move the hand 23*c* to a position further than a position in a case in which with the substrate S is conveyed with being positioned at the center of the hand 23*c*. In other words, in a case in which the hand 23*c* is moved to the receiving part 30*a* on the X1 side, it is necessary to move the hand 23*c* to a position closer to the X1 side, while in a case in which the hand 23*c* is moved to the receiving part 30*b* on the X2 side, it is necessary to move the hand 23*c* to a position closer to the X2 side. Because a movable range of the hand 23*c* is previously determined, an upper limit of the predetermined distance D2 is necessarily specified to a value within a range that allows the hand 23*c* to reach the receiving part 30 even if the substrate S is deviated with respect to the center of hand 23*c*.

Axis-to-Axis Distance of Link

Figure 6:
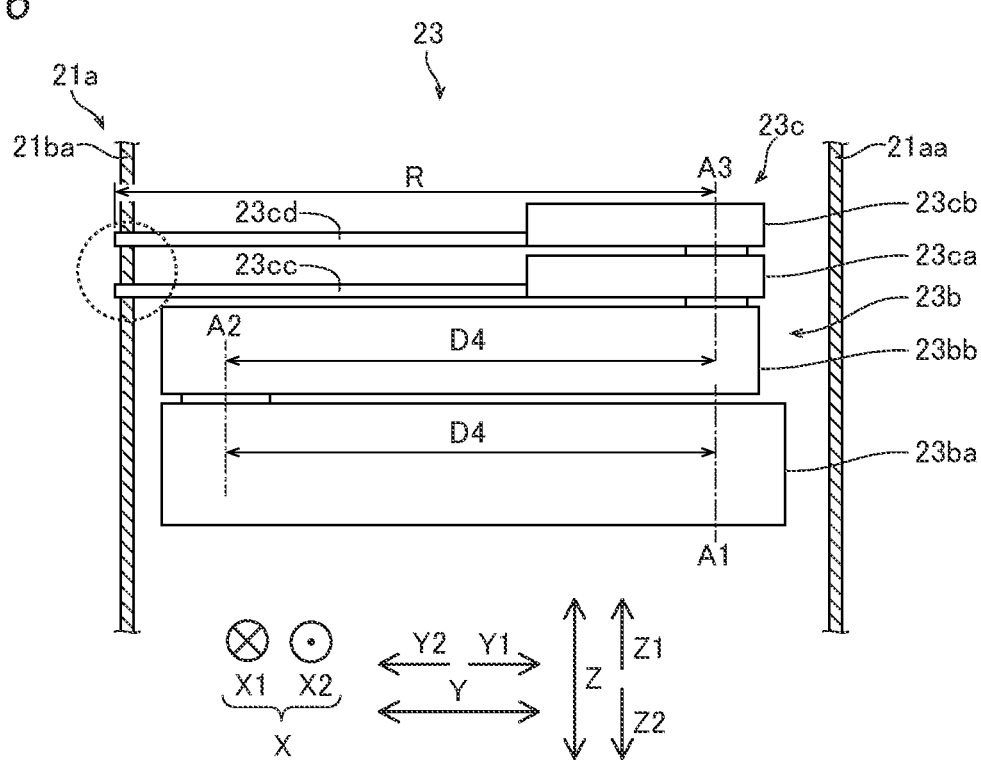
FIG. 6 is a schematic view illustrating exemplary arms having the same axis-to-axis distance.

In a case in which the first link 23*ba* and the second link 23*bb* have the same axis-to-axis distance D4 as shown in FIG. 6, the hands 23*c* interfere with wall 21*a* in some cases. Specifically, in the case in which the first link 23*ba* and the second link 23*bb* have the same axis-to-axis distance D4, if a rotation radius R of the hand 23*c* is large, the hands 23*c* interfere with the Y2-side wall 21*ab* opposite to the Y1-side wall 21*aa* to which the robot 23 is arranged closer.

Figure 7:
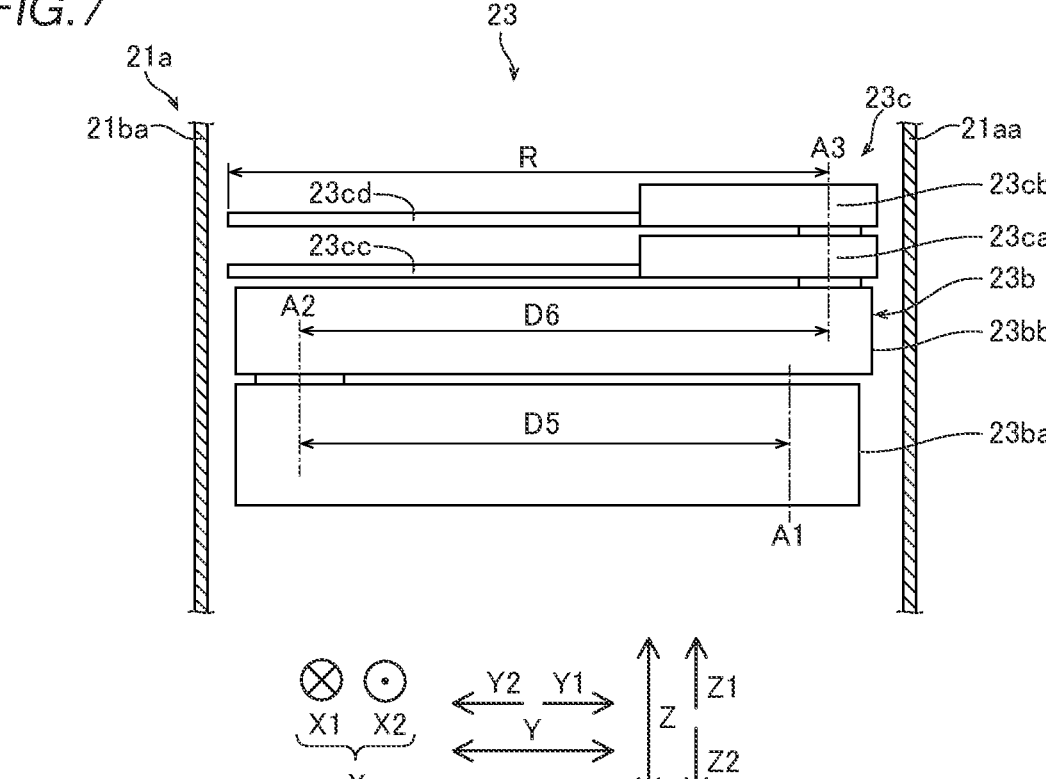
FIG. 7 is a schematic view illustrating axis-to-axis distances of arms according to the one embodiment.

To address this, as shown in FIG. 7, in the first embodiment, the first link 23*ba* and the second link 23*bb* have axis-to-axis distances D5 and D6 different from each other so as to prevent interference of the hands 23*c* with the wall 21*ab*. Specifically, the axis-to-axis distance D6 of the second link 23*bb* is greater than the axis-to-axis distance D5 of the first link 23*ba* so that the hands 23*c* do not interfere with the wall 21*ab*. Accordingly, because the hand 23*c* can be arranged closer to the wall 21*aa* opposite to the wall 21*ab* with which the hand interferes, it is possible to prevent interference of the hand 23*c* with the wall 21*ab* even if the rotation radius R of the hand 23*c* is large. The axis-to-axis distance D5 is a distance between the rotation axis A1 and the rotation axis A2. The axis-to-axis distance D6 is a distance between the rotation axis A2 and the rotation axis A3. Also, the rotation radius R is a distance between the rotation axis A3 and the distal end of the hand 23*c*.

The rotation axis A3 is positioned a side closer the wall 21*aa* opposite to the wall 21*ab* with which the hand interferes relative to the rotation axis A1 with the first link 23*ba*, the second link 23*bb* and the hands 23*c* being folded and overlapping each other in the Z direction.

Advantages of the Embodiment

In this embodiment, as described above, the operations of the hands 23*c* and the robot arm are controlled to convey the substrate S with distances between the centers of the hands 23*c* and end surfaces of the substrate S being uneven so as to prevent interference of the substrate S with the wall. Accordingly, even in a case in which the substrate S will interfere with the wall 21*a* with the substrate S being arranged at the center of the hand 23*c*, interference of the substrate S with the wall 21*a* can be prevented by conveying the substrate S with the distances between the centers of the hands 23*c* to the end surface of the substrate S. Consequently, the substrate S can be smoothly conveyed.

In this embodiment, as described above, the hands 23*c* include a first hand 23*ca*, and a second hand 23*cb* arranged above the first hand 23*ca* and configured to operate independently of the first hand 23*ca*; the controller 23*d* is configured to control the operations of the hands 23*c* so as to move, when one of the first hand 23*ca* and the second hand 23*cb* enters the receiving part 30 as an entry hand, another of the first hand 23*ca* and the second hand 23*cb* as a leaving hand away from the receiving part 30; and the controller 23*d* controls the operations of the hands 23*c* and the robot arm 23*b* to convey the substrate S with the distances between the centers of the hands 23*c* and the end surfaces of the substrate S being uneven by deviating the substrate S by a predetermined distance with respect to the center of the entry hand in a direction in which the leaving hand moves away from the receiving part 30 so as to prevent interference of the substrate S, which is held by the leaving hand, with the wall 21*a*. Accordingly, even if the substrate S held by the leaving hand interferes with the wall 21*a* when the leaving hand leaves in a case in which the substrate S is conveyed with the substrate S being position at the center of the entry hand, because the substrate S is conveyed with the distances between the centers of the hands 23*c* and the end surfaces of the substrate S being uneven by deviating the substrate S with respect to the center of the entry hand in a direction in which the leaving hand moves away from the receiving part 30, it is possible to effectively prevent that the substrate S held by the leaving hand interferes with the wall 21*a*.

In this embodiment, as described above, the robot arm 23*b* includes a plurality of links 23*ba* and 23*bb*, and a plurality of joints 23*bc*, 23*bd* and 23*be*; and each of the plurality of joints 23*bc*, 23*bd* and 23*be* includes an electric motor, and a speed reducer including gears. Accordingly, because the plurality of links 23*ba* and 23*bb*, and the hands 23*c* can operate independently of each other, it is possible to surely provide a high degree of freedom to convey the substrate S even without a mover that is configured to drive the base 23*a* to run dissimilar to a case in which the robot arm 23*b* is extended/retracted by interconnecting the plurality of links 23*ba* and 23*bb* with each other. Because the mover can be omitted, the substrate S can be conveyed between the plurality of receiving parts 30 while preventing a structure of the robot from becoming complicated as compared with a case in which the mover is provided.

In a case in which the mover is not provided, a relatively long robot arm 23*b* is required to convey the substrate S in a wide range so that torques for driving the plurality of links 23*ba* and 23*bb*, and the hands 23*c* are increased. To address this, each of the plurality of joints 23*bc*, 23*bd* and 23*be* includes a speed reducer including gears to transmit a driving force of the electric motor through the gears suitable for transmitting a large torque, and as a result it is possible to easily drive the plurality of links 23*ba* and 23*bb*. Also, in a case in which a large substrate S having a rectangular shape is conveyed, because a torque for driving each of the plurality of links 23*ba* and 23*bb* is likely to increase, transmission of the driving force of the electric motor through the gears suitable for transmitting such a large torque is very effective.

In this embodiment, as described above, the plurality of links 23*ba* and 23*bb* include the first link 23*ba* connected to the base 23*a*, and the second link 23*bb* connected to the first link 23*ba* and connected to the hand 23*c*; the plurality of joints 23*bc*, 23*bd* and 23*be* include the first joint 23*bc* configured to drive the first link 23*ba*, the second joint 23*bd* configured to drive the second link 23*bb*, and the third joint 23*be* configured to drive the hand 23*c*; the electric motors 41 and 51 and the speed reducers 42 and 52 of the first joint 23*bc* and the second joint 23*bd* are arranged in the first link 23*ba*; and the electric motor 41 and the speed reducer 42 of the third joint 23*be* are arranged in the second link 23*bb*. Because space for the electric motor 51 and the speed reducer 52 of the second joint 23*bd* is not required in the second link 23*bb*, it is possible to prevent increase of the second link 23*bb*. Because increase of a weight of the second link 23*bb* due to such increase of the second link 23*bb* can be prevented, it is possible to prevent increase of a capacity of the electric motor 51 of the second joint 23*bd* due to such increase of the weight of the second link 23*bb*.

In this embodiment, as described above, the electric motor 41 of the first joint 23*bc* is arranged to face the proximal end in the first link 23*ba* in an orientation parallel to an extension direction A4 of the first link 23*ba*; the electric motor 51 of the second joint 23*bd* is arranged to face the distal end in the first link 23*ba* in an orientation parallel to the extension direction A4 of the first link 23*ba*; and the electric motors 61 and 62 of the third joint 23*be* are arranged to face the distal end in the second link 23*bb* in an orientation parallel to an extension direction A6 of the second link 23*bb*. As a result, it is possible to prevent increase of a thickness of each link dissimilar to a case in which the electric motors of each of the first joint 23*bc*, the second joint 23*bd*, and the third joint 23*be* are arranged in a thickness direction orthogonal to the extension direction of each link.

In this embodiment, as described above, the plurality of links 23*ba* and 23*bb* include the first link 23*ba* connected to the base 23*a*, and the second link 23*bb* connected to the first link 23*ba* and connected to the hand 23*c*; and the first link 23*ba* and the second link 23*bb* have axis-to-axis distances D5 and D6 different from each other so as to prevent interference of the hands 23*c* with the wall 21*a*. Accordingly, even in a case in which the hands 23*c* interfere with wall 21*a* if the first link 23*ba* and the second link 23*bb* have the same axis-to-axis distance D4, because the first link 23*ba* and the second link 23*bb* have the different axis-to-axis distances D5 and D6, respectively, it is possible to prevent interference of the hands 23*c* with the wall 21*a*.

In this embodiment, as described above, the axis-to-axis distance D6 of the second link 23*bb* is greater than the axis-to-axis distance of the first link 23*ba* so that the hands 23*c* do not interfere with the wall 21*a*. Accordingly, because the axis-to-axis distance D6 of the second link 23*bb* connected to the hands 23*c* is greater than the axis-to-axis distance of the first link so that the hands 23*c* can be arranged closer to the wall 21*a* that is opposite to the wall 21*a* with which the hand interferes, it is possible to effectively prevent interference of the hands 23*c* with the wall 21*a*.

In this embodiment, as described above, the base 23*a* is positioned at a position that is deviated from a center line C of the conveying space 20*a*. Because the robot arm 23*b* can be long, the substrate S can be easily conveyed between the plurality of receiving parts 30 without a mover that is configured to drive the base 23*a* to run.

In this embodiment, as described above, the hands 23*c* include the first hand 23*ca*, and the second hand 23*cb* arranged above the first hand 23*ca* and configured to operate independently of the first hand 23*ca*. Because the substrate S can be conveyed by two hands of the first hand 23*ca* and the second hand 23*cb*, it is possible to improve an efficiency of conveyance of the substrate S.

Modified Embodiments

Note that the embodiment disclosed this time must be considered as illustrative in all points and not restrictive. The scope of the present disclosure is not shown by the above description of the embodiments but by the scope of claims for patent, and all modifications or modified examples within the meaning and scope equivalent to the scope of claims for patent are further included.

While the example in which the robot arm includes two links has been shown in the aforementioned embodiment, the present disclosure is not limited to this. In the present disclosure, alternatively, the robot arm can include three or more links.

While the example in which two hands are arranged in the distal end part of the robot arm has been shown in the aforementioned embodiment, the present disclosure is not limited to this. In the present disclosure, alternatively, one hand, or three or more hands can be arranged in the distal end part of the robot arm.

While the example in which the electric motor and the speed reducer of the second joint are arranged in the first link has been shown in the aforementioned embodiment, the present disclosure is not limited to this. In the present disclosure, alternatively, the electric motor and the speed reducer of the second joint can be arranged in the second link.

While the example in which, in a case in which the substrate held by the leaving hand interferes with the wall when the leaving hand leaves, the substrate S is conveyed with being deviated with respect to the center of the hand so as to prevent interference of the substrate with the wall has been shown in the aforementioned embodiment, the present disclosure is not limited to this. In the present disclosure, alternatively, in a case in which the substrate held by the hand, which is not limited to the leaving hand, interferes with the wall at any time during the substrate is conveyed the substrate can be conveyed with distances between the center of the hand and end surfaces of the substrate being uneven so as to prevent interference of the substrate with the wall.

While the example in which the first link and the second link have axis-to-axis distances different from each other has been shown in the aforementioned embodiment, the present disclosure is not limited to this. In the present disclosure, alternatively, the first link and the second link have the same axis-to-axis distance if the substrate does not interfere with the wall. Also, the axis-to-axis distance of the first link can be greater than the axis-to-axis distance of the second link.

Figure 8:
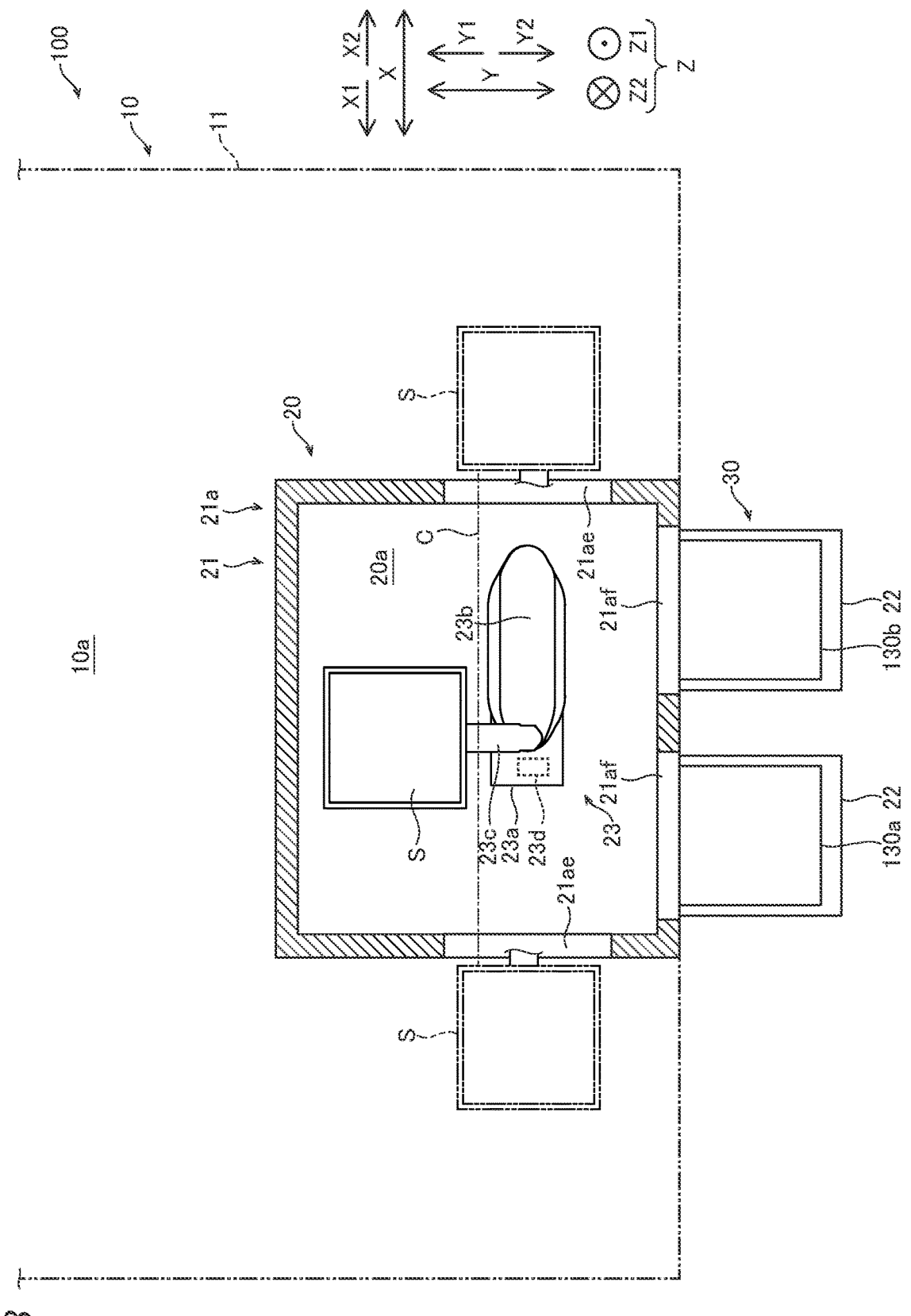
FIG. 8 is a schematic diagram showing a configuration of a substrate processing system according to a modified embodiment of the one embodiment.

An arrangement and the number of receiving parts in the aforementioned embodiment are merely illustrative and are not specifically limited. In a modified embodiment shown in FIG. 8, two receiving parts 130*a* and 130*b* are provided as substrate containers.

While the example in which an atmosphere in the conveying space is previously adjusted to a predetermined degree of cleanliness has been shown in the aforementioned embodiment, the present disclosure is not limited to this. In the present disclosure, alternatively, an atmosphere in the conveying space can be previously adjusted to a predetermined gas atmosphere by gas purging, or to a vacuum atmosphere by reducing a pressure in the conveying space.

While the example in which no mover configured to drive the base to run is provided has been shown in the aforementioned embodiment, the present disclosure is not limited to this. In the present disclosure, alternatively, a mover configured to drive the base to run can be provided.

Functions of elements disclosed in this specification can be realized by a circuit or processing circuit including a general purpose processor, a dedicated processor, an Integrated circuit, ASIC (Application Specific Integrated Circuits), a conventional circuit and/or combination of them configured or programmed to realize the functions disclosed. Because processors include transistors and other circuits, they are considered as a processing circuit or a circuit. In the present disclosure, circuits, units or means are hardware for realizing the functions stated above, or hardware programmed to realize the functions stated above. The hardware can be hardware disclosed in this specification, or can be other known hardware programed or configured to realize the functions stated above. In the case in which the hardware is a processor that can be considered as one type of circuits, the circuit, means or unit is a combination of hardware and software, and the software is used for configuration of the hardware and/or the processor.

Modes

The aforementioned exemplary embodiment will be understood as concrete examples of the following modes by those skilled in the art.

Mode Item 1

A robot according to mode item 1 includes a base; a horizontal multi-joint robot arm connected to the base; a hand(s) arranged in a distal end part of the robot arm and configured to hold a rectangular plate-shaped workpiece(s); and a controller configured to control operations of the hand(s) and the robot arm so as to convey the workpiece(s) between a plurality of receiving parts, wherein the hand(s) and the robot arm are arranged in conveying space surrounded by walls, and the controller is configured to control the operations of the hand(s) and the robot arm to convey the workpiece(s) with distances between a center(s) of the hand(s) and end surfaces of the workpiece(s) being uneven so as to prevent interference of the workpiece(s) with the wall.

Mode Item 2

In the robot according to mode item 1, the hands include a first hand, and a second hand arranged above the first hand and configured to operate independently of the first hand; the controller is configured to control the operations of the hands so as to move, when one of the first hand and the second hand enters the receiving part as an entry hand, another of the first hand and the second hand as a leaving hand away from the receiving part; and the controller is configured to control the operations of the hands and the robot arm to convey the workpieces with distances between the center of the hand and the end surfaces of the workpieces being uneven by deviating the workpieces by a predetermined distance with respect to the center of the entry hand in a direction in which the leaving hand moves away from the receiving part so as to prevent interference of the workpiece that is held by the leaving hand with the wall.

Mode Item 3

In the robot according to mode item 1 or 2, the robot arm includes a plurality of links, and a plurality of joints; and each of the plurality of joints includes an electric motor, and a speed reducer including gears.

Mode Item 4

In the robot according to mode item 3, the plurality of links include a first link connected to the base, and a second link connected to the first link and connected to the hand(s); the plurality of joints include a first joint configured to drive the first link, a second joint configured to drive the second link, and a third joint configured to drive the hand(s); the electric motor and the speed reducer of each of the first joint and the second joint are arranged in the first link; and the electric motor and the speed reducer of the third joint are arranged in the second link.

Mode Item 5

In the robot according to mode item 4, the electric motor of the first joint is arranged to face a proximal end part in the first link in an orientation parallel to an extension direction of the first link; the electric motor of the second joint is arranged to face the distal end part in the first link in an orientation parallel to the extension direction of the first link; and the electric motor of the third joint is arranged to face the distal end part in the second link in an orientation parallel to an extension direction of the second link.

Mode Item 6

In the robot according to any of mode items 1 to 5, the robot arm includes a plurality of links; the plurality of links include a first link connected to the base, and a second link connected to the first link and connected to the hand(s); and the first link and the second link have axis-to-axis distances different from each other so as to prevent interference of the hand(s) with the wall.

Mode Item 7

In the robot according to mode item 6, the axis-to-axis distance of the second link is greater than the axis-to-axis distance of the first link so that the hand(s) does/do not interfere with the wall.

Mode Item 8

In the robot according to any of mode items 1 to 7, the base is positioned at a position deviated from a center line of the conveying space.

Mode Item 9

In the robot according to any of mode items 1 to 8, the hands include a first hand, and a second hand arranged above the first hand and configured to operate independently of the first hand.

What is claimed is:

1. A robot comprising:

a base;

a horizontal multi-joint robot arm connected to the base;

a plurality of hands arranged in a distal end part of the robot arm and configured to hold a rectangular plate-shaped workpiece, wherein the hands include a first hand and a second hand arranged above the first hand and configured to operate independently of the first hand; and a controller configured to control operations of the hands and the robot arm so as to convey a plurality of the workpieces between a plurality of receiving parts, wherein the hands and the robot arm are arranged in a conveying space surrounded by a plurality of walls, the controller is configured to control the operations of the hands so as to move, when one of the first hand and the second hand enters a first receiving part of the plurality of receiving parts as an entry hand, the other of the first hand and the second hand as a leaving hand away from the first receiving part, and the controller is configured to control the operations of the hands and the robot arm to convey the workpieces with a first distance between the center of each hand and a first end surface of each workpiece being different from a second distance between the center of each hand and a second end surface of each workpiece, by deviating each workpiece by a predetermined distance with respect to the center of the entry hand in a direction in which the leaving hand moves away from the first receiving part so as to prevent interference of the workpiece that is held by the leaving hand with a first wall of the plurality of walls, wherein the predetermined distance is set based on a third distance between an interior surface of the first wall of the conveying space and a part of each workpiece that interferes with the first wall in a case in which each workpiece is centered on each hand.

2. The robot according to claim 1, wherein the robot arm includes a plurality of links, and a plurality of joints; and each of the plurality of joints includes an electric motor, and a speed reducer including gears.

3. The robot according to claim 2, wherein the plurality of links include a first link connected to the base, and a second link connected to the first link and connected to the hands;

the plurality of joints include a first joint configured to drive the first link, a second joint configured to drive the second link, and a third joint configured to drive the hands;

the electric motor and the speed reducer of each of the first joint and the second joint are arranged in the first link; and the electric motor and the speed reducer of the third joint are arranged in the second link.

4. The robot according to claim 3, wherein a surface of the electric motor of the first joint is arranged to face a proximal end part in the first link in an orientation parallel to an extension direction of the first link;

a surface of the electric motor of the second joint is arranged to face a distal end part in the first link in an orientation parallel to the extension direction of the first link; and a surface of the electric motor of the third joint is arranged to face a distal end part in the second link in an orientation parallel to an extension direction of the second link.

5. The robot according to claim 1, wherein the robot arm includes a plurality of links;

the plurality of links include a first link connected to the base, and a second link connected to the first link and connected to the hands; and the first link and the second link have axis-to-axis distances different from each other so as to prevent interference of the hands with the first wall.

6. The robot according to claim 5, wherein the axis-to-axis distance of the second link is greater than the axis-to-axis distance of the first link so that the hands do not interfere with the first wall.

7. The robot according to claim 1, wherein the base is positioned at a position deviated from a center line of the conveying space.

8. A conveying system comprising:

a substrate conveyor including conveying space; and a robot arranged in the substrate conveyor, wherein the robot includes a base, a horizontal multi-joint robot arm connected to the base, a plurality of hands arranged in a distal end part of the robot arm and configured to hold a rectangular plate-shaped workpiece, wherein the hands include a first hand and a second hand arranged above the first hand and configured to operate independently of the first hand, and a controller configured to control operations of the hands and the robot arm so as to convey a plurality of the workpieces between a plurality of receiving parts, and wherein the hands and the robot arm are arranged in the conveying space surrounded by a plurality of walls, the controller is configured to control the operations of the hands so as to move, when one of the first hand and the second hand enters a first receiving part of the plurality of receiving parts as an entry hand, the other of the first hand and the second hand as a leaving hand away from the first receiving part, and the controller is configured to control the operations of the hands and the robot arm to convey the workpieces with a first distance between the center of each hand and a first end surface of each workpiece being different from a second distance between the center of each hand and a second end surface of each workpiece, by deviating each workpiece by a predetermined distance with respect to the center of the entry hand in a direction in which the leaving hand moves away from the first receiving part so as to prevent interference of the workpiece that is held by the leaving hand with a first wall of the plurality of walls, wherein the predetermined distance is set based on a third distance between an interior surface of the first wall of the conveying space and a part of each workpiece that interferes with the first wall in a case in which each workpiece is centered on each hand.

9. The conveying system according to claim 8, wherein the robot arm includes a plurality of links, and a plurality of joints; and each of the plurality of joints includes an electric motor, and a speed reducer including gears.

10. The conveying system according to claim 9, wherein the plurality of links include a first link connected to the base, and a second link connected to the first link and connected to the hands;

the plurality of joints include a first joint configured to drive the first link, a second joint configured to drive the second link, and a third joint configured to drive the hands;

the electric motor and the speed reducer of each of the first joint and the second joint are arranged in the first link; and the electric motor and the speed reducer of the third joint are arranged in the second link.

11. The conveying system according to claim 10, wherein a surface of the electric motor of the first joint is arranged to face a proximal end part in the first link in an orientation parallel to an extension direction of the first link;

a surface of the electric motor of the second joint is arranged to face a distal end part in the first link in an orientation parallel to the extension direction of the first link; and a surface of the electric motor of the third joint is arranged to face a distal end part in the second link in an orientation parallel to an extension direction of the second link.

12. A method for controlling a robot including a base, a horizontal multi-joint robot arm connected to the base; a plurality of hands arranged in a distal end part of the robot arm and configured to hold a rectangular plate-shaped workpiece, the hands including a first hand and a second hand arranged above the first hand and configured to operate independently of the first hand, and the hands and the robot arm being arranged in a conveying space surrounded by a plurality of walls, the method comprising:

controlling operations of the hands and the robot arm so as to convey a plurality of the workpieces between a plurality of receiving parts, wherein the controlling operations include:

controlling the operations of the hands so as to move, when one of the first hand and the second hand enters a first receiving part of the plurality of receiving parts as an entry hand, the other of the first hand and the second hand as a leaving hand away from the first receiving part, and controlling the operations of the hands and the robot arm to convey the workpieces with a first distance between the center of each hand and a first end surface of each workpiece being different from a second distance between the center of each hand and a second end surface of each workpiece, by deviating each workpiece by a predetermined distance with respect to the center of the entry hand in a direction in which the leaving hand moves away from the first receiving part so as to prevent interference of the workpiece that is held by the leaving hand with a first wall of the plurality of walls, wherein the predetermined distance is set based on a third distance between an interior surface of the first wall of the conveying space and a part of each workpiece that interferes with the first wall in a case in which each workpiece is centered on each hand.

\* \* \* \* \*